No. 795,289. PATENTED JULY 25, 1905.
G. A. LOWRY.
MACHINE FOR MAKING FABRICS.
APPLICATION FILED FEB. 23, 1904. RENEWED DEC. 24, 1904.
6 SHEETS—SHEET 6.
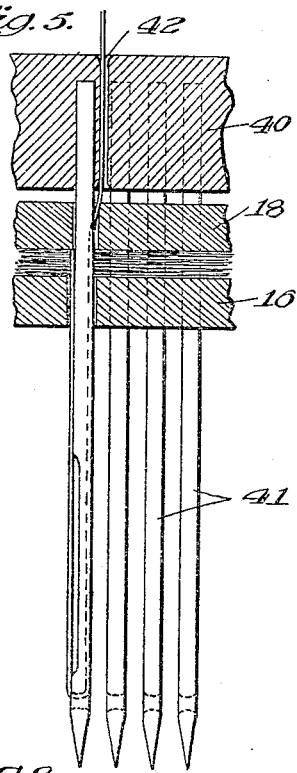
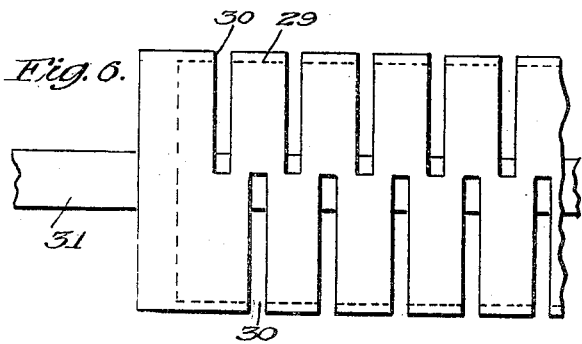
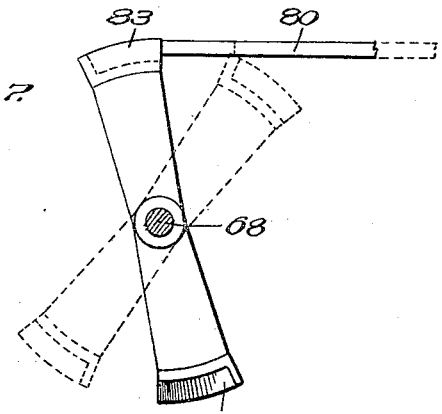
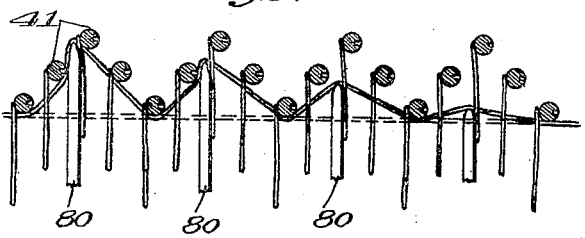
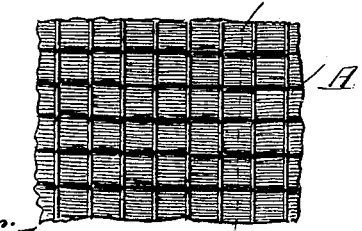
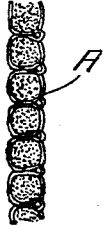
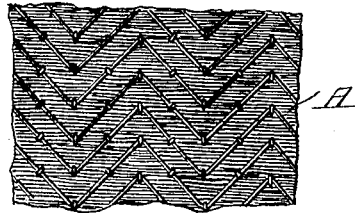
Witnesses.
Wm. M. Rheem
C. H. Seem
Inventor
George A. Lowry
by Brown & Darby
att'ys

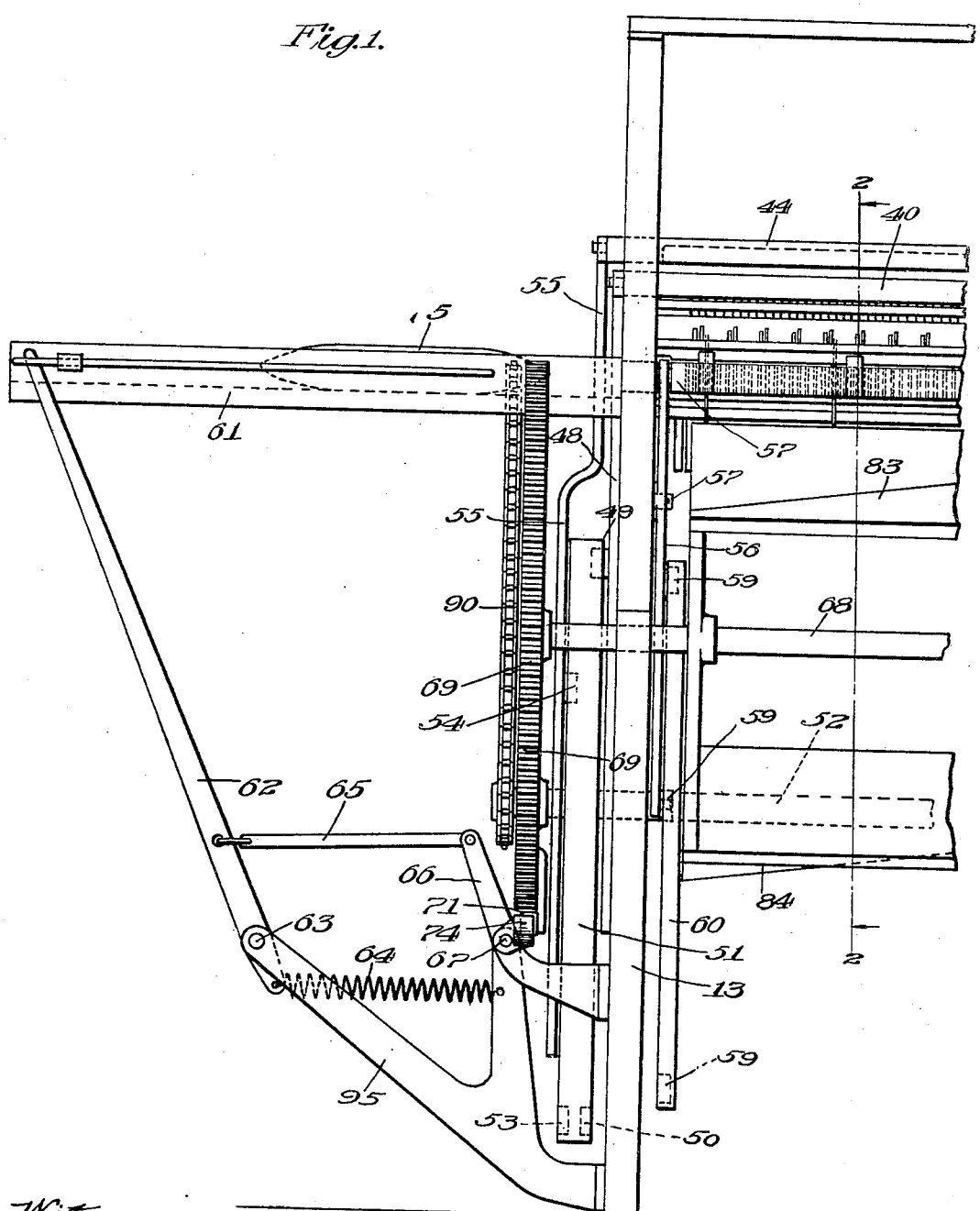

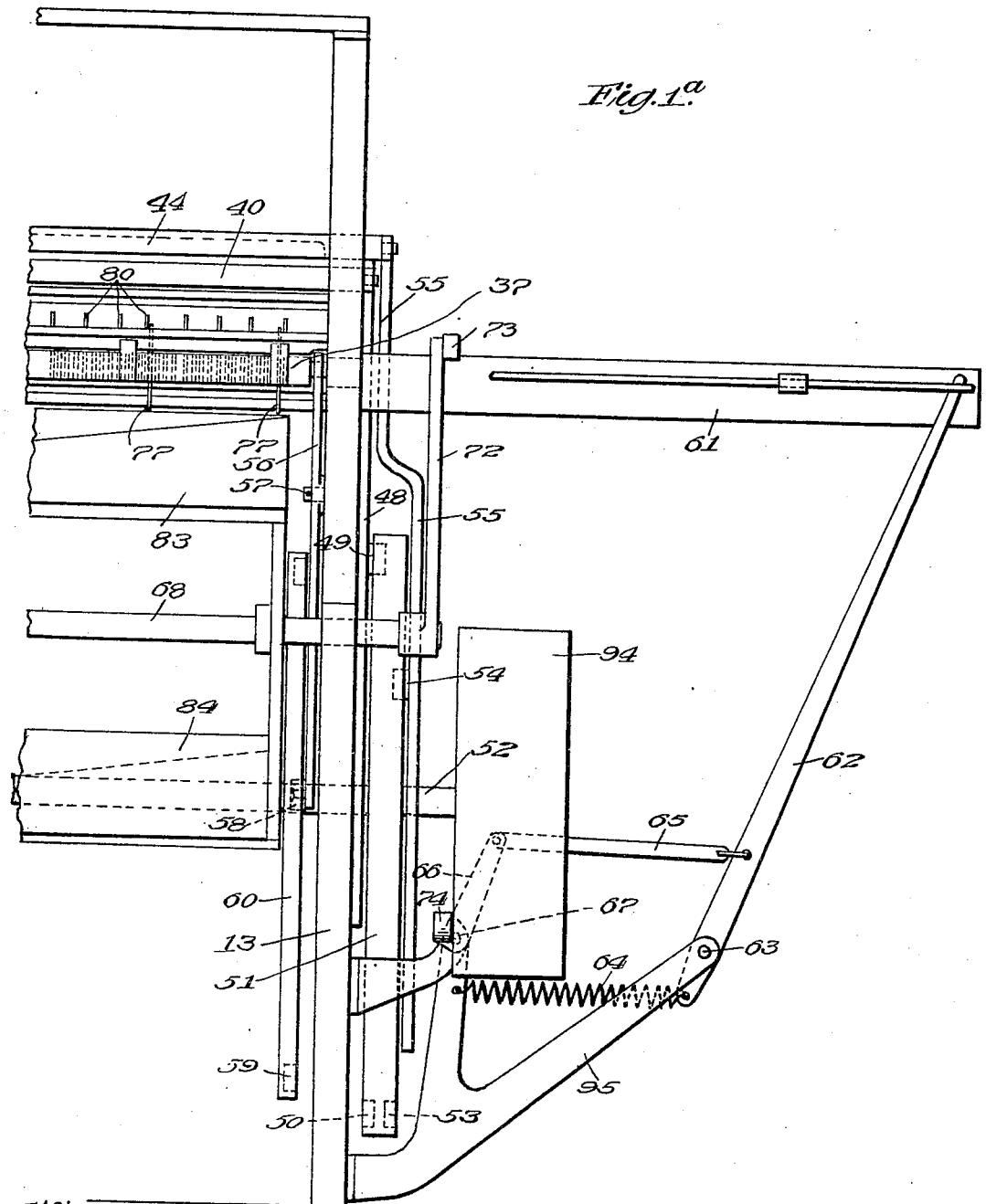

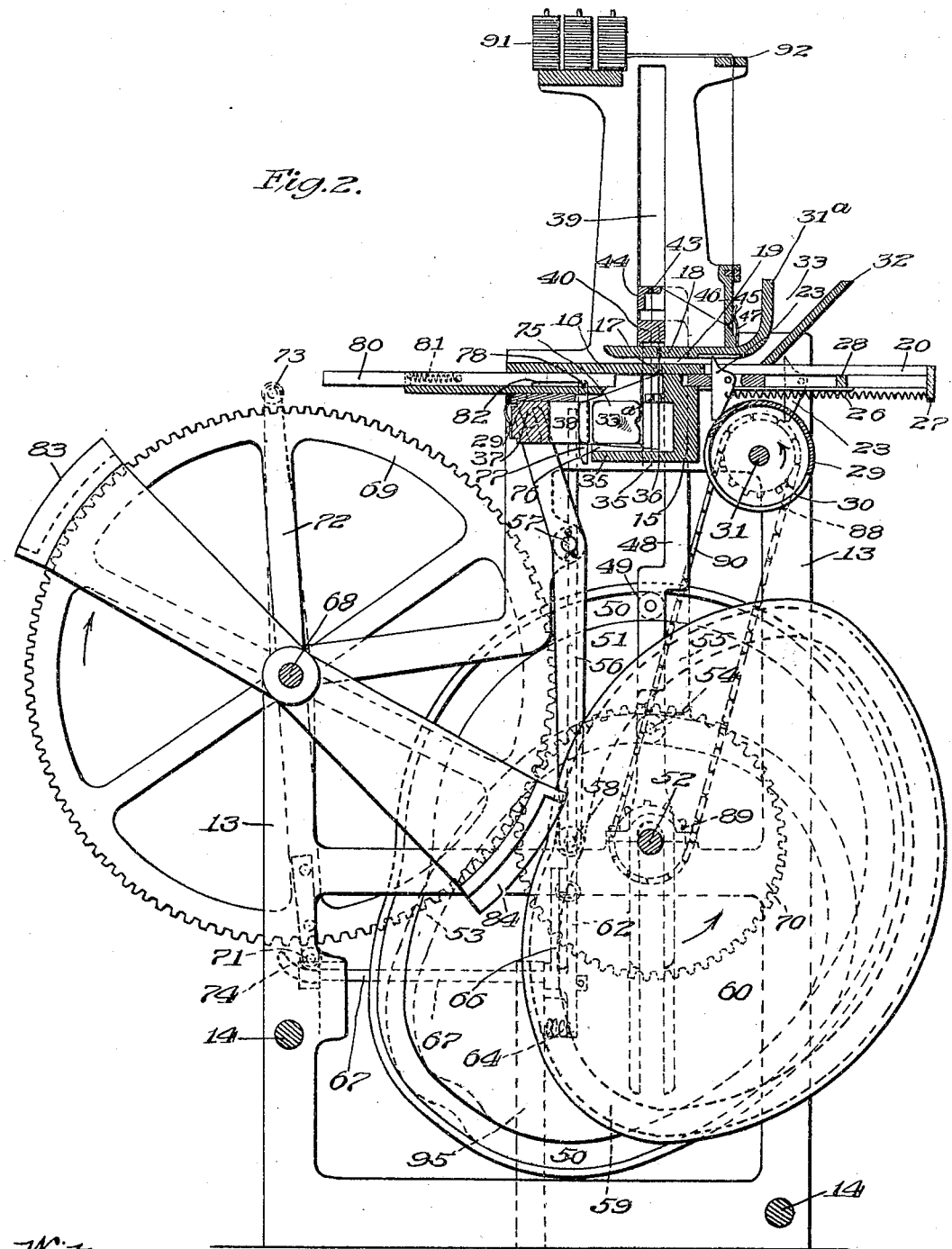

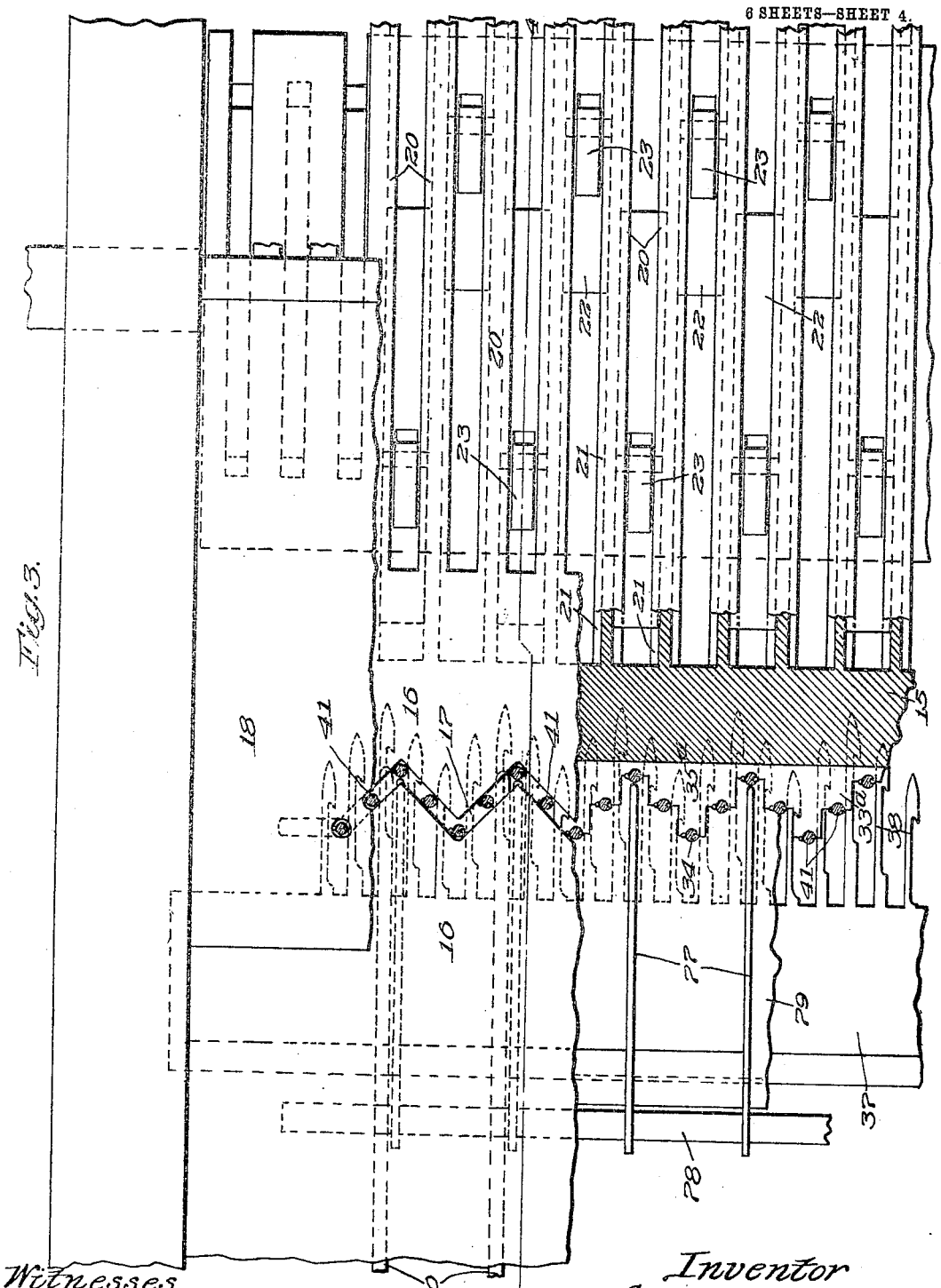

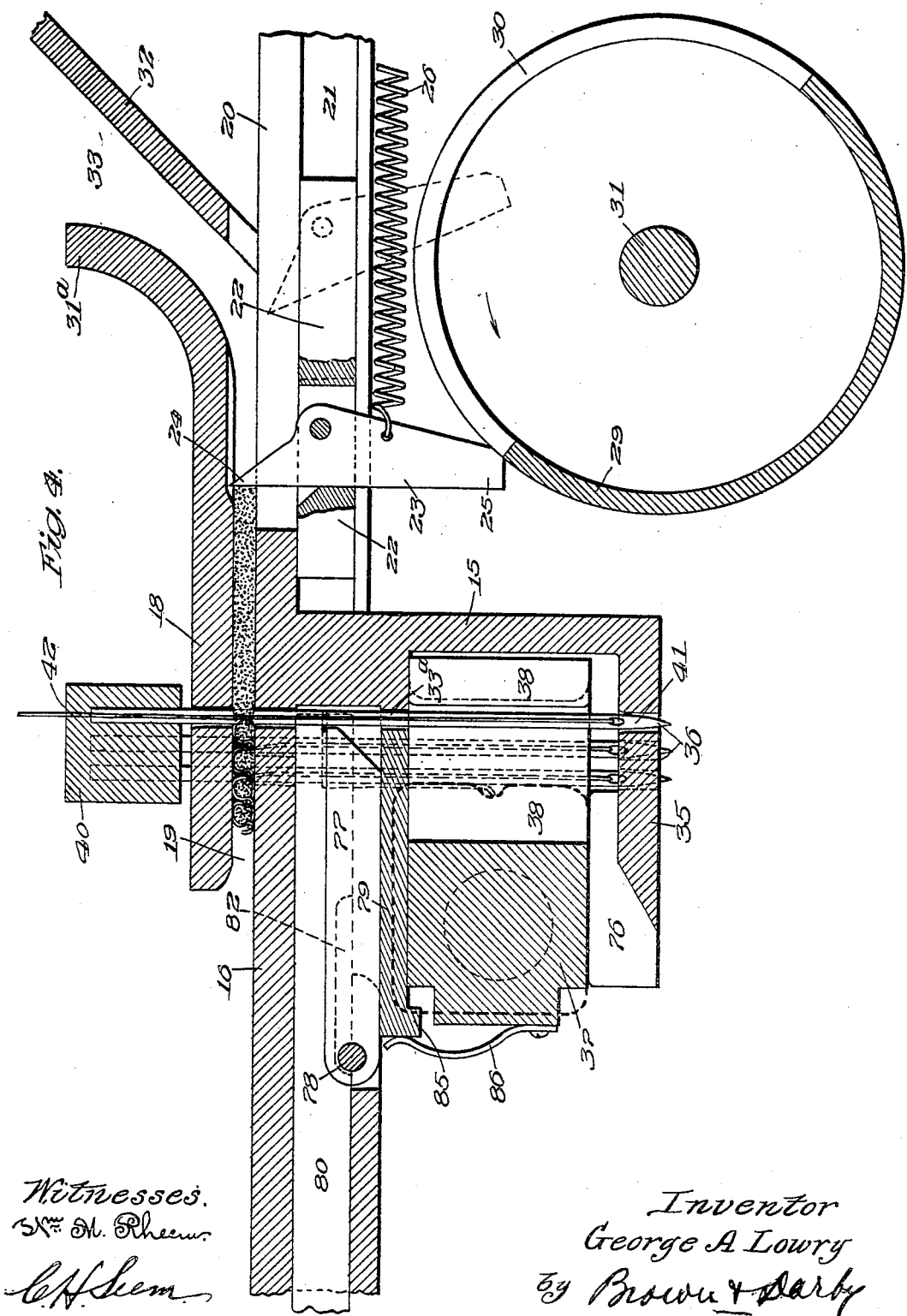

UNITED STATES PATENT OFFICE.

GEORGE A. LOWRY, OF CHICAGO, ILLINOIS.

MACHINE FOR MAKING FABRICS.

No. 795,289.　　　　　Specification of Letters Patent.　　　　Patented July 25, 1905.

Application filed February 23, 1904. Renewed December 24, 1904. Serial No. 238,228.

*To all whom it may concern:*

Be it known that I, GEORGE A. LOWRY, a citizen of the United States, residing at Chicago, in the county of Cook and State of Illinois, have invented a new and useful Machine for Making Fabrics, of which the following is a specification.

This invention relates to machines for making fabrics of grass, straw, or other similar material.

The object of the invention is to provide a machine which is simple in construction and efficient in operation for manufacturing fabrics of grass, straw, and the like.

A further object of the invention is to provide a machine of the character referred to wherein the body of the fabric is composed of unspun stems, stalks, or spears of grass, hay, and the like compacted to the desired thickness and width.

A further object of the invention is to provide a machine of the character described wherein a mass of stems, stalks, or spears of grass, hay, straw, or other similar material is stitched to form the fabric and wherein the stitching and shuttle threads are applied to the mass in zigzag relation, the shuttle-threads partially overlapping each other in the successive stitching operations.

Other objects of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Referring to the accompanying drawings and to the various views and reference-signs appearing thereon, Figures 1 and 1ª taken together show a machine embodying the principles of my invention in rear elevation, Fig. 1 being an elevation of the left-hand side of the rear end of the machine and Fig. 1ª being an elevation of the right-hand side of the rear end of the machine. Fig. 2 is a view in vertical longitudinal section on the line 2 2 of Fig. 1 looking in the direction of the arrows. Fig. 3 is a view in plan of a portion of the machine, parts being broken off and parts broken away and parts in horizontal section in order to more clearly illustrate the relation which various parts bear to each other. Fig. 4 is a vertical longitudinal section through a portion of the machine, taken on the line 4 4 of Fig. 3. Fig. 5 is a broken detail sectional view of the needle-bar, the table, and the upper or top plate coöperating with the table to form the passage through which the grass, straw, or the like is fed. Fig. 6 is a broken detail view, in side elevation, of the slotted drum which actuates the feeding-dogs. Fig. 7 is a detail view, in end elevation, of the cam employed for operating the zigzagging-bars, the supporting-shaft for said cam being in transverse section. Fig. 8 is a broken detail view in plan illustrating the operation of certain of the devices employed to form the loops in the stitching-threads, the needles being shown in horizontal section. Fig. 9 is a view in diagram illustrating the manner of manipulation of the shuttle-thread in accordance with the principles of my invention. Fig. 10 is a broken view, in top plan, of a portion of fabric produced in accordance with the principles of my invention. Fig. 11 is a sectional view of the same on the line 11 11, Fig. 10. Fig. 12 is a view in plan of the reverse side of the fabric shown in Fig. 10.

In various sections throughout the country are vast areas of marshes upon which is grown immense quantities of marsh-grass, and throughout wide areas of the country vast quantities of straw are produced, especially in the wheat-growing sections of the country, and which are burned or otherwise destroyed in order to get rid of it. In efforts heretofore made to utilize these vast quantities of marsh-grass, straw, and the like the stems, stalks, or spears of grass or straw have been formed into a twine and the twine has been woven into fabrics, mats, rugs, carpets, and the like. Vast quantities of marsh-grass, straw, and the like, however, are unsuitable for utilization in this manner, being unable to stand the manipulation necessary to work the same up into twine or to weave the twine into fabrics by reason of the joints in such stems, stalks, or spears, and consequently the manufacture of mattings, carpets, or other fabrics out of grass, straw, or the like has been limited to the use of unjointed grasses. Moreover, where the stems, stalks, or spears of grass, hay, and the like are first formed into a twine and then such twine is woven into fabrics the twine presents substantially a solid unyielding body for the warp-threads of the woven fabric to rest upon or to bear against, thereby imposing excessive wear upon such warp, and hence greatly shortening the life of the same. In accordance with the principles of my present invention I propose to work up the stems, stalks, or spears of grass, hay, and the like into a fabric without first forming such stems, stalks, or spears into twine and then weaving the twine, thereby saving the expense incident to the manufacture of the stems, stalks, or spears of grass into twine and also enabling me to employ the jointed as well as the unjointed grass, hay, and the like and at the same time forming a soft yielding flexible body portion to form the bearing-surface upon which the warp employed rests.

In carrying out my invention I propose to arrange the stems, stalks, spears, or the like in the form of a matting or flattened mass of substantially equal thickness and density throughout and of substantially the ultimate width of the fabric to be produced and preferably, though not necessarily, with the stems, stalks, or spears in substantially parallel relation with respect to each other and to unite the same into a finished product or fabric by stitching the same, and one of the important features of my invention is the manner of applying the stitches so as to efficiently bind the stems, stalks, or spears into an integral fabric, thereby producing an exceedingly smooth, simple, and durable fabric which is soft and flexible and which may be produced in quantity unlimited except by the amount of grass, straw, or the like available, and this supply is practically unlimited.

In the accompanying drawings I have shown a construction of machine embodying the principles of my invention as an illustrative form of mechanism capable of carrying my invention into practical operation and the best form in which I at present contemplate carrying out the principles of my invention, but to which I do not desire to be limited or restricted in respect of the details of construction and arrangement thereof and wherein I employ a framework comprising side frames 13 13, suitably bolted together by means of the tie-rods 14 and the table-support 15. This framework may be of any suitable material and of sufficient size, strength, and arrangement to support the various operating parts of the mechanism. Upon the table-support 15 is arranged the table 16 to extend transversely across the machine and through which is provided a zigzag slot 17. (See Fig. 3.) Suitably suspended over the table 16 and extending transversely across the machine is a top plate 18, said top plate being sufficiently raised above the surface of table 16 to form a passage 19 therebetween, to and through which the material is fed during the operation of the machine. This top plate 18 is provided with openings therethrough in line with the zigzag slot 17 in table 16 and through which the needles operate, as will be more fully explained hereinafter. By relatively adjusting the distance apart of the top plate 18 and the table 16 the thickness of the fabric to be produced may be regulated.

The material employed in the manufacture of the fabric in the form of stems, stalks, or spears of grass, hay, straw, or similar material may be fed into and progressed through the space or passage 19 between the top plate 18 and table 16 in many specifically different ways. While, therefore, I have shown and will now describe a construction of feeding mechanism for the material to be operated on, I do not desire to be limited or restricted thereto, as many variations therefrom and changes in the details of construction thereof would readily suggest themselves to persons skilled in the art and still fall within the spirit and scope of my invention. In the particular form shown I provide the top plate 18 with an upturned end 31$^a$ at its forward edge, and suitably mounted upon the framework and coöperating with the upturned portion 31$^a$ of top plate 18 is a plate 32, forming with said upturned portion 31$^a$ a hopper 33, into which the material to be operated on may be deposited in any suitable or convenient manner. In practice I prefer to place the stems, stalks, or spears of grass, hay, straw, or the like in the hopper 33 in substantially parallel relation with respect to each other and extending transversely of the machine and in sufficient quantities to enable the feeding devices to deliver the same from the hopper and into the space 19 in increments, each increment corresponding to the amount of material to be included between successive stitches taken by each of the needles, as will appear more fully hereinafter, and preferably the stems, stalks, or spears are arranged in such relation with respect to the direction of presentation of their butt-ends as to produce a fabric of even density and thickness throughout in the finished product. Extending forwardly of the machine from the table-support 15 and beneath the feed-hopper are the arms 20, said arms being provided with guiding-grooves 21, in which are received and guided the slides 22. Upon each slide 22 is pivotally mounted a feed-dog 23. Each feed-dog 23 is provided with a feeding-point 24, operating when the dog is suitably rocked upon its pivot to be projected through the space between arms 20, between which arms its slide 22 is mounted so as to extend above said arms and into position to engage a portion of the contents of the hopper 33 when said slide is moved rearwardly or toward the stitching mechanism and to feed such portion of material toward the stitching mechanism and into the space 19 between the top plate 18 and the table 16. Each feed-dog 23 is provided with a tailpiece 25, extending below the arms 20, and to the tailpiece 25 of each feed-dog is connected one end of a spring 26, the other end of the spring being suitably connected to a convenient portion of the front end of the machine, such, for instance, as the cross-bar 27. (See Fig. 2.) The tension of the springs 26 is constantly exerted upon the feed-dogs 23 is a direction to rock or swing the feeding-points 24 thereof down out of feeding relation with respect to the material contained in the hopper. Suitably journaled in the framework of the machine and extending transversely across the same and at a point below the hopper is a shaft 31, upon which is mounted a drum 29, (see Figs. 2, 4, and 6,) said drum being provided with slots 30. In practice and as shown, but to which I do not desire to be limited or restricted, I employ two sets of feeding-dogs 23, so as to secure an alternate feeding action thereof. It is desirable that when one set of feed-dogs is advanced to perform its work of feeding a portion of the stalks, stems, or straws from the hopper into the space 19 the dogs composing such set be retained in advanced position until the next set of dogs is advanced to feed a succeeding portion of the material from the hopper into such space and that thereafter the dogs comprising the first set be quickly retracted to initial position and without interposing interference or obstruction to the feeding action of the second set of feed-dogs. In order to accomplish these results, I provide the feed-dog-actuating drum 29, having the slots 30 therein, each alternate slot extending half-way around the periphery of the drum and each intermediate slot extending half-way around the drum on the other side thereof, and I so relatively arrange the feed-dogs 23 composing each set with reference to the feed-dog-actuating drum that the tailpieces 25 of the dogs of one set will coöperate with alternate slots 30 in the actuating-drum 29, while the tailpieces 25 of the other set will coöperate with the intermediate slots 30 of the feed-drum. The operation of this part of my invention is as follows: Rotation is imparted in any convenient manner to the drum 29 and in the direction indicated by the arrows in Figs. 2 and 4. The limit ends of one set of slots 30 engage the tailpieces 25 of one set of feed-dogs, which we will assume are in their retracted or initial position. The set of feed-dogs thus engaged are thereby moved rearwardly of the machine, the slides 22 moving in the guides 21 and against the action of the associated springs 26, the initial movement of such feed-dogs 23 resulting in a rocking of the same upon their pivots, so as to extend or project the feeding ends or points 24 thereof into feeding relation with respect to the hopper 33. This feeding movement of the dogs continues until the dogs reach the position shown in full lines in Figs. 2 and 4, at which time the tailpieces 25 thereof ride out of their coöperating slots 30 in drum 29 and onto the peripheral surface of such drum. Consequently these feed-dogs are maintained in the limit of their feeding movement. In the meantime the feeding-dogs comprising the other set are in retracted position, as shown in dotted lines in Fig. 4. The continued rotation of drum 29 brings the ends of the other set of slots 30 into position to engage the tailpieces of the retracted feed-dogs, thereby first rocking the same against the action of their retractiles 26 to elevate the feeding-points 24 thereof, and thereafter to move said dogs rearwardly of the machine in the same manner as above explained to advance another portion of the material from the hopper. As this second set of feed-dogs approach the limit of their feeding movement and begin to ride onto the peripheral surface of the feed-drum contiguous to the ends of their coöperating slots 30 the slots 30 corresponding to the first set of feed-dogs will have been brought into position for the tailpieces 25 of such first set of dogs to be received therein, thereby releasing the feed-dogs of the first set and permitting their retractiles 26 to first rock their engaging or feeding points 24 down below the arms 20, and thereafter to return said feed-dogs to initial position ready for the next operation. Thus it will be seen that I provide an exceedingly simple and efficient feeding mechanism for the stems, stalks, or spears of grass, hay, straw, or the like and wherein the material is fed to the machine in successive increments, each set of feed-dogs advancing a portion of such material into the passage in which the fabric is to be formed and correspondingly advancing the material contained in such space or passage and holding the same against the tendency to spring back until the next increment of material is fed from the feed-hopper.

It is obvious that the principle of operation above explained may be carried out or extended to as many sets of feeding-dogs as may be desired without departure from the spirit and scope of my invention. It is also obvious, as above pointed out, that variations in the details of construction and arrangement of feeding mechanism as above described would readily occur or suggest themselves to persons skilled in the art and still fall within the spirit and scope of my invention. I do not desire, therefore, to be limited or restricted to the exact details of construction and arrangement of feeding mechanism which I have shown and herein described. It will be observed that in the operation of the feeding mechanism above described the material is progressed into the passage 19 in successive increments or bunches of equal size or volume and that the material thereby packed into the space 19 is intermittently progressed or advanced through such space or passage to a uniform distance each time a set of the feed-dogs is actuated to effect a feeding of an increment of the material thereto.

I will now describe the stitching mechanism by which the material which is intermittently progressed, as above described, into and through the passage 19 is bound into a fabric, and while I have shown and will now describe one construction and arrangement of stitching mechanism I desire to be understood that my invention is not to be limited or restricted to the exact details of construction and arrangement shown and described, as many variations therefrom and changes in the details of construction thereof would readily suggest themselves to persons skilled in the art and still fall within the spirit and scope of my invention, the essential feature being the provision of means whereby each successive bunch or increment of material is bound or stitched to its preceding bunch or increment, as well as to its succeeding bunch or increment. In other words, in accordance with the principles of my invention I apply the stitching-threads to the material forming the body of the fabric to be produced in lapping relation, particularly in respect to the shuttle-thread employed in the stitching operation, and to this end I arrange the needles employed in effecting the stitching operation in staggered or zigzag relation with respect to each other, and I provide means for correspondingly staggering or zigzagging the shuttle-thread, so as to coöperate with the staggered or zigzag relation of the needles, and so as to enable the shuttle-thread to be applied to the fabric, so as to embrace or encompass in successively overlapping relation adjacent portions of the fabric. One form of mechanism for accomplishing this result is shown in the accompanying drawings as an illustrative embodiment of an operative mechanism and the best form in which I at present contemplate carrying out the principles thereof, but to which I do not desire to be limited or restricted, and wherein reference-sign 40 designates the needle-bar, in which are suitably secured or mounted the needles 41. This needle-bar is arranged to extend transversely across the machine and is held and guided for vertical reciprocation in guides 39, formed in the side bars or frames of the machine. As above explained and as indicated in the drawings, the needles 41 are arranged in a staggered or zigzag line transversely across the machine. In the vertical reciprocations of the needle-bar 40 the needles 41 operate through the openings in the top plate 18 and the zigzag slot 17 in table 16, and when the needles occupy their position of extreme downward limit of movement their ends are received in openings 36, also arranged in corresponding zigzagged or staggered relation, formed through a rearwardly-projecting ledge or shelf 35 of the table-supporting bar 15. In this manner the needles are suitably guided in their reciprocations and are held against lateral movement when in the limits of their downward movement. The needle-thread is carried in spools 91, suitably mounted or supported upon the frame of the machine, and is led from such spools through suitable guides 92 and 93 (see Fig. 2) and a tension device 47 through openings 45 in a stationary part 46 of the framework, and thence through openings 43 in a take-up bar 44, arranged to extend transversely across the machine and to reciprocate vertically in the guides 39 of the frame and at a point above the needle-bar 40. Thence the thread extends through openings 42 in the needle-bar and to the eyes of the needles and thence to the fabric. The table-support 15 is provided with rearwardly-projecting ledges $33^a$ at a point below the table 16 and above the ledge 35 and in line with the line of reciprocatory movements imparted to the needles. These ledges or projections are staggered—that is, they are of varying extent and in staggered relation corresponding to the staggered or zigzag arrangement of the needles (see Fig. 8)—and provided with semicircular seats, indicated at 34, (see Fig. 3,) forming additional guides for the needles. The rearwardly-projecting ledge or shelf 35 of the table-support 15 forms a chamber or passage which extends transversely across the machine, and at a point beneath the table 16, as clearly shown, and through this transverse passage the shuttle 75 operates, as will be more fully explained hereinafter. Before the shuttle is caused to traverse this passage, however, from one side of the machine to the other it is necessary to form the loops in the thread carried by the needles. In order to accomplish this result, I provide a bar 37, arranged to extend transversely of the machine and having its ends operating in suitable guides in the framework. This bar is arranged beneath the table and rearwardly with respect to the path traversed by the shuttle, and I provide means for reciprocating said bar toward and from the transverse chamber through which the shuttle operates. Carried by the bar 37 and arranged to extend forwardly therefrom or toward the plane of operation of the needles are a plurality of hooked fingers 38, corresponding in number to the number of needles and also staggered or zigzagged to conform to the staggered or zigzagged line of needles, a hooked finger 38 being provided for each needle. When the bar 37 is moved forwardly of the machine, the hooked ends of the fingers 38 pass by their corresponding needles and into position for the hooks thereon to engage the thread leading to the eyes of the needles, so that when the bar 37 is again moved rearwardly of the machine or to the position thereof shown in Fig. 2 the thread is drawn from the needle, being rendered or slacked from the spools 91, so as to make the loops, as indicated in Fig. 2, around the space traversed by the shuttle when the latter is reciprocated across the machine. When the shuttle 75 is thrown from one side of the machine to the other through the transverse passage above referred to and through the loops formed in the needle-threads, it will be seen that the shuttle-thread, as indicated in dotted lines in Fig. 9, will occupy a straight line extending transversely across the machine and to the rear of the rearmost needles 41. It will also be seen that the line of shuttle-thread is at a point lower than the point of application of the needle-threads to the fabric. Under these conditions it becomes necessary and desirable not only to raise the shuttle-thread to a point adjacent to the point of application of the needle-thread to the fabric to form the stitch, but it is also necessary or desirable to zigzag the shuttle-thread so as to conform to the zigzag or staggered line of needles. It is also desirable to provide means whereby the needle-threads when engaged by the hooked fingers 38 and drawn out to form the loops may be prevented from becoming disengaged from the hooked ends of fingers 38. To accomplish these objects, I employ fingers 77, pivotally mounted at one end upon a rod 78, extending transversely across the machine, said fingers being arranged to swing vertically or in a vertical plane beneath the table 16. When the hook-bar 37 is in its rear limit of movement, as shown in Fig. 2, the fingers 77 hang freely downwardly, as shown therein, and between the hooks 38, and hence out of the way of the path of operation of the shuttle in passing through the loops in the needle-threads. When, however, the hook-bar 37 begins its movement toward the lines of action of the needles—that is, after the shuttle-thread has been passed through the loops in the needle-threads—a plate 79, mounted upon the hook-bar 37, engages the swinging fingers 77 and rocks or swings the same upwardly and toward the under side of the table 16 and into the position shown in Fig. 4, and since at this time of operation the shuttle-thread, which has been placed in position within the loops of the needle-threads, is in the path of the ends of the fingers 77 said shuttle-thread will be engaged by the free ends of said fingers and lifted throughout its length up to the position shown in Fig. 4. The next step in the operation is to draw sufficient thread from the shuttle to permit the same to be zigzagged or staggered to conform to the zigzag line of needles and to carry the shuttle-thread into such zigzag relation. In order to accomplish this result, I provide a series of sliding bars 80, arranged to slide in guideways formed in the table 16 and toward and from the line of action of the needles. The front ends of these slide-bars 80 are arranged to intersect the line occupied by the shuttle-thread when raised by the free ends of fingers 77 into the position shown in Fig. 4. The sliding bars 80 are normally held retracted in any convenient manner—as, for instance, by means of retractiles 81. A slot 82, formed in the slide-bars 80 and engaging with the rod 78, upon which fingers 77 are hinged or pivoted, serves as stops to limit the movement of the sliding bars 80. It is obvious that any other suitable or convenient arrangement of stop device might equally well answer the purpose. When the sliding bars 80 are advanced, the front ends thereof engage the shuttle-thread and carry it into zigzag relation with respect to the zigzag line of needles, as indicated in Fig. 9, thereby facilitating the completion of the stitch by the needle-threads when the needles are raised.

I have above referred to a plate 79, mounted upon the hook-bar 37. This plate 79 is arranged between the under surface of the table 16 and the top surface of hook-bar 37, being held between these parts, and is mounted for slight movement relative to hook-bar 37, being provided with a shoulder 85, (see Fig. 4,) arranged to extend over the rear upper edge of the hook-bar 37, and a spring or other yielding means (indicated at 86) serves to normally operate to press the shoulder 85 into engaging relation with respect to the rear upper edge of the hook-bar. The plate 79 is arranged transversely across the machine and extends forwardly toward the lines of action of the needles and at a point opposite the ledge $33^a$, formed on the table-support 15. At its front edge the plate 79 is shaped to conform to the contour of the rear edge of ledge $33^a$, as clearly shown in Fig. 8, having semicircular seats 87, corresponding to the seats 34, formed in the rear edge of ledge $33^a$, so that when plate 79 is moved forward the seats, recesses, and staggered outline of the front edge thereof register with corresponding features of the ledge $33^a$, as most clearly shown in Figs. 3 and 4, thereby virtually forming a plate with perforations therethrough arranged in a staggered or zigzagged line corresponding to the zigzagged line of needles, and hence forming guides at this point for the needles. When the hook-bar 37 begins its rearward travel, said bar is permitted a certain range of rearward movement without effecting a withdrawal movement of plate 79, and consequently by reason of this relative movement of hook-bar 37 with respect to plate 79 the needle-threads which have been caught or engaged by the hooks 38 are drawn into the semicircular seats 87, formed in the front edge of plate 79, whereby such threads are held and guided therein and prevented from becoming disengaged from the hooks 38 during the remainder of the rearward travel of the hook-bar. Thereafter the rear edge of the hook-bar 37 engages the depending shoulder 85 of plate 79, and the continued rearward movement of the hook-bar is partaken of by plate 79, so as to retract or withdraw the same to retracted position.

The various movable parts above referred to may be actuated by any suitable or convenient arrangement of operating mechanism. I have shown a simple arrangement which I have found effective, but to which I do not desire to be limited or restricted. In the particular form shown I employ a main drive-shaft 52 and arrange the same to extend transversely across the machine and carrying a drive-pulley 94 upon one end thereof adapted to receive rotation from any convenient source. Suitably mounted upon shaft 52 adjacent to each end thereof to rotate therewith are cam-disks 51 and 60. In the particular form shown, to which my invention is not limited, however, the cam-disks 60 are arranged on the inside of the side frames 13, while the cam-disks 51 are arranged on the outside of said side frames. Each cam-disk 51 is provided with a cam-groove 50 on the inner face thereof and a cam-groove 53 on the outer face thereof. Straddled over shaft 52 are forks formed in the end of arms 48, said arms being suitably connected at their upper ends to the ends of the needle-bar 40. Each of the arms 48 is provided with a stud 49, arranged to operate in the cam-groove 50 of its adjacent and associated cam-disk 51. By reason of this construction it will be seen that the arms 48 are held against lateral vibration or movement, while permitted free vertical movement according to the formation of the cam-grooves 50 therein. Similarly forked arms 55 are straddled over the shaft 52 at each end thereof and connected at their upper ends to take-up bar 44, each of said arms 55 being provided with a stud 54, operating in the cam-grooves 53 in the cam-disks 51, thereby, according to the configuration of the cam-grooves 53, imparting vertical reciprocation to the take-up bar 44. Suitably pivoted upon the side frames 13, as at 57, are levers 56. These levers are pivotally connected at their upper ends to the hook-bar 37 and at their lower ends carry studs 58, operating within the cam-groove 59, formed in the disks 60, whereby, according to the configuration of cam-grooves 59, said arms 56 are rocked and the hook-bar 37 correspondingly reciprocated.

The feed-dog-actuating drum 29 may be driven from main drive-shaft 52 in any convenient manner—as, for instance, by means of a sprocket-chain 90, operating over sprocket-gears 89 and 88, respectively, mounted upon shafts 52 and 31.

I have above referred to the use of the shuttles 75. These shuttles may be operated—that is, thrown back and forth transversely across the machine in the operation thereof—by any suitable or convenient form of shuttle-throwing mechanism. While, therefore, I have shown and will now describe one form of shuttle-throwing mechanism, I do not desire to be limited or restricted thereto, as many variations therefrom and changes in the details of construction thereof would readily occur to persons skilled in the art and still fall within the spirit and scope of my invention. In the particular form shown I mount a spur-gear 70 upon main drive-shaft 52 and arrange the same to mesh with and drive a gear 69, mounted upon a shaft 68, suitably journaled in the framework of the machine and arranged to extend transversely across the machine. Carried by the gear 69 on one side of the machine is a roller or projection 71, (see Figs. 1 and 2,) and on the other end of shaft 68 is carried a crank-arm 72, upon which is mounted a similar roller or projection 73, arranged in diametrically opposite relation with respect to the projection or roller 71, carried by gear 69. Upon a bracket 95 at each side of the machine is pivotally mounted a shuttle-throwing arm 62, to the lower end of which is connected one end of a spring or other retractile 64, the other end of said spring being suitably connected to a fixed part of the framework, the tension of said springs being normally exerted in a direction to rock or swing the shuttle-throwing arm 62 outwardly or away from the machine. To each shuttle-throwing arm 62 is pivotally connected one end of a link 65, the other end of said link being pivotally connected to a crank-arm 66, mounted upon a rock-shaft 67, suitably journaled in the machine-frame and carrying a crank-arm arranged to form a contact or cam shoe 74. Cam roller or projection 71 coöperates with the cam shoe or crank 74 on one side of the machine to rock-shaft 67 on that side of the machine in a direction to swing shuttle-throwing arm 62 in a direction to throw the shuttle from the left-hand toward the right-hand side of the machine, as viewed in the rear elevation of Figs. 1 and 1ª, and similarly the roller or projection 73, carried by the crank-arm 72 on the opposite end of shaft 68, coöperates with the cam shoe or crank 74 on the opposite side of the machine to rock or swing the shuttle-throwing arm 62 on that side in a direction to return the shuttle, the shuttle being received on the holders 61 at each side of the machine. It will be observed that the shuttle, when thrown from one side of the machine to the other by the rocking of its actuating-arms 62 about their pivots 63, rests on ledges 76 and is guided on one side by the needles and on the other side by the forward edges of the hooks 38. It will also be observed and, as above explained, that the shuttle operates in a line below the line of feed of the fabric or material to form the fabric, and consequently when the shuttle-thread is stretched from one side of the machine to the other its path may be traced from the edge of the fabric on one side of the machine down through the passage which has been traversed by the shuttle in its throw from that side of the machine to the center of the shuttle on the other side of the machine and will be pulled straight across the machine immediately in rear of the rear set of needles, as indicated in dotted lines in Fig. 9. It is while occupying this position that the fingers 77 are brought into operation to elevate or raise the shuttle-thread into position in front of the front ends of the zigzagging bars 80, and I have described the function and mode of operation of these bars when advanced to their work of drawing the shuttle-thread from the shuttle to form sufficient slack to enable the shuttle-thread to become zigzagged to correspond to the zigzag relation occupied by the needles. Any suitable means may be provided for effecting the advancing movements of the zigzagging bars 80 against the action of their retractiles 81. I have shown a simple arrangement for accomplishing this result, but to which I do not desire to be limited or restricted, wherein I mount upon shaft 68 to rotate therewith cam-plates 83 84. (See Figs. 2 and 7.) These cams are in the form of plates extending transversely across the machine and having their engaging edges formed on an incline, as clearly shown in Figs. 1, 1ª, 2, and 7, the inclined engaging surfaces of the two cam-plates 83 84 being in reverse order with respect to each other. By this construction it will be observed that the engaging surface of each cam-plate 83 84 engages the zigzag bars 80 successively or one after the other and pushes the same forwardly until they successively reach a point about in line with the forward set of needles, as indicated to the left of Fig. 9. In this manner the shuttle-thread is drawn from the shuttle progressively, thereby enabling sufficient slack to be rendered therein from the shuttle and without danger of breaking or severing it and enabling the thread thus rendered to be formed into zigzag relation to correspond to the zigzag relation of the needles. After all the zigzag bars 80 have been pushed forwardly and have formed the shuttle-thread into zigzag relation the actuating-cam 83 or 84, as the case may be, passes by the rear ends of the arms 80, thereby permitting said slide-arms to be retracted quickly. The cam-plates 83 84 are arranged diametrically opposite each other, one of said plates being designed to operate upon the zigzag slide-arms 80 when the shuttle has been thrown to one side of the machine and the other cam-plate being designed to operate upon said slide-arms when the shuttle has been thrown to the opposite side of the machine.

The operation of the machine will now be fully understood from the foregoing description, taken in connection with the accompanying drawings, and is as follows: Material is supplied to the hopper 33 and rotation is imparted to the main drive-shaft 52. Thereupon the material is engaged by the feed-dogs 23 in increments and crowded into the space or passage 19 between the top plate 18 and the bed-plate 16, which space or passage determines the thickness of the fabric to be produced. The material thus crowded by increments or successive accretions advances the mass of material contained in said passage intermittently and to an amount or extent determined by the amount or increment added thereto at each advancement of a set of feed-dogs. Assuming now the parts to be in the positions as shown in Fig. 2, the needles are in their lowered position and the hook-bar 37 is in its retracted position, and these parts are at rest. The shaft 52, turning in the direction indicated by the arrows, imparts rotation to the cams 51 and 60 and to gear 70, which, meshing with gear 69, imparts rotation to shaft 68, thereby bringing cam roller or projection 71 into engagement with the shoe or crank 74, and hence actuating the shuttle-throwing arm 62 on the left-hand side of the machine as viewed in Fig. 1 and causing the shuttle to be thrown from this side of the machine to the other. The cam-groove 59 in cam-disks 60 now acts upon levers 56 to advance hook-bar 37, the needles remaining in their lowered position. During this time the needle-thread take-up bar 44 is rising through the action of cam-grooves 53 in cam-disks 51, thereby taking up the slack in the loops formed in the needle-thread by the previous withdrawal of the hook-bar 37. The advancing movement of the hook-bar 37 causes fingers 77 to be swung upwardly into the position shown in Fig. 4, thereby raising the shuttle-thread into proper relation in advance of the front ends of the zigzagging bars 80. Just before the hooks 38 attain the limit of their forward movement the zigzagging bars 80 begin their forward movement, thereby drawing enough thread from the shuttle and placing the same in zigzag relation, as indicated in Fig. 9. As soon as the hooks 38 attain their forward limit of movement and come to rest the needle-bar begins its rising movement, and by the time the eyes of the needles in the rising movement thereof have reached the shuttle-thread the zigzagging bars 80 have completed their work of providing sufficient slack in the shuttle-thread and of arranging the same in zigzag relation and have been released by their actuating cam-plate 83 or 84 to permit the same to snap back out of the way. The needles then complete their upward movement, the needle-threads drawing the shuttle-thread up to the under side of the fabric. During the forward movement of the needle-bar the take-up bar 44 continues to rise until both needle-bar and take-up bar come to rest at the upward movement of their travel. A set of feed-dogs 23 now advance a fresh supply or increment of material to the feed-passage 19, and just before the said advancing set of feed-dogs have attained the limit of their feeding movement sufficiently to advance the mass of material and the fabric contained in the passage 19 the cam-grooves 53 are so shaped as to permit the take-up bar 44 to slightly descend, thereby allowing sufficient slack in the needle-threads to permit the stitched fabric to be advanced sufficiently for another stitch to be formed. The take-up bar then rises again and pulls the fresh thread from the spools. The needles now descend to the lowermost limit of their stroke, and the operation above described is repeated.

By reference to Figs. 10, 11, and 12 it will be seen that the fabric (indicated generally by reference-sign A) is of substantially uniform thickness and density throughout and presents a smooth surface on both sides, and from the foregoing description of mechanism employed in the production of this product it will be understood that the thread from each needle is lapped over the shuttle-thread to form the stitch, and by reason of the peculiar arrangement of needles in a staggered line and by correspondingly staggering the shuttle-thread and advancing the mass of material to be formed into a fabric an equal distance following each downward reciprocation of the needle-bar the needle-thread is inserted through the mass or body of the fabric at equal distances apart and that the stitches are formed in overlapping relation with respect to each other, each increment or bundle of material being stitched and bound to the adjacent bundle or increment of material on each side thereof.

In the foregoing description I have described the shuttle-thread as being applied to the mass of material in zigzag lines. I do not desire, however, to be limited in this respect, as it is obvious that these binding-threads may be applied in any other suitable or convenient relation, the essential feature being that such binder-threads are to be applied in a manner to efficiently bind together into an integral mass or fabric the unspun and unwoven material employed for the body portion thereof.

It is obvious that many variations and changes in the details of construction and arrangement would readily occur to persons skilled in the art and still fall within the spirit and scope of my invention. I do not desire, therefore, to be limited or restricted to the exact construction, arrangement, or relative location of the parts as shown and described; but, Having set forth the object and nature of my invention and a construction of mechanism embodying the principles thereof, what I claim as new and useful and of my own invention, and desire to secure by Letters Patent, is—

1. In a machine for making fabrics, means for condensing or compacting loose, untwisted, unspun or unwoven material into a flattened mass of the desired density and width to produce the fabric, in combination with means for applying a binder thereto to bind such mass into an integral fabric, as and for the purpose set forth.

2. In a machine for making fabrics, means for condensing or compacting loose, untwisted, unspun or unwoven material into a flattened mass of the desired density and width, in combination with means for applying a binder thereto in lines inclined with respect to each other, as and for the purpose set forth.

3. In a machine for making fabrics, means for condensing or compacting loose, unspun, unwoven material into a flattened mass of the desired density and width, in combination with means for applying binder-threads thereto and on opposite sides of the flattened surfaces thereof, one of said threads looping around the other to hold the mass into an integral fabric, as and for the purpose set forth.

4. In a machine for making fabrics, means for condensing or compacting loose, untwisted, unspun or unwoven material into a flattened mass of the desired density and thickness and ultimate width, in combination with means for applying a binder-thread to one side or surface thereof with loops formed therein, said loops projecting through the mass of material, and means for applying a binder-thread to the opposite side or surface of such mass and through said loops, as and for the purpose set forth.

5. In a machine for making fabrics, means for condensing or compacting loose, untwisted, unspun or unwoven material into a flattened mass of the desired thickness, width and density, in combination with means for applying a binder-thread to one side or surface of such mass in successive loops, said loops extending through the body of said mass, and means for applying a binder-thread to the opposite side or surface of the mass and through said loops, and in inclined relation with respect to the plane defined by said first-mentioned thread and the loops contained therein, as and for the purpose set forth.

6. In a machine for making fabrics, means for condensing or compacting loose, untwisted, unspun or unwoven material into a flattened mass of the desired density width and thickness, in combination with a needle mechanism including needles arranged to be projected through such mass to apply binder-threads to one side or surface of said mass, means for forming loops in the threads projected through said mass, and means for applying binder-threads to the opposite side or surface of said mass and through said loops, as and for the purpose set forth.

7. In a machine for making fabrics having a body portion composed of unspun stems, stalks or spears of grass, straw or the like, means for condensing and compacting the stems, stalks or spears into a flattened mass of the desired thickness, width and density, in combination with mechanism for applying binder-threads to the surface of said mass in diagonal or inclined relation with respect to the lengths of the stems, stalks or spears, and means for securing said binder-threads to said mass to bind the latter into an integral fabric, as and for the purpose set forth.

8. In a machine for making fabrics having a body portion composed of unspun stems, stalks or spears of grass, straw or the like, means for condensing and compacting such stems, stalks or spears into a flattened mass of the desired thickness, width and density, in combination with needle and shuttle mechanisms, said needle mechanism operating to project binder-threads through the mass of condensed or compacted stems, stalks, or spears, means arranged to engage the threads thus projected through such mass and operating to form the same into loops, said shuttle mechanism operating to project coöperating binder-threads through said loops, as and for the purpose set forth.

9. In a machine for making fabrics having a body portion composed of stems, stalks or spears of grass, straw or the like, means for condensing or compacting such stems, stalks or spears into a flattened mass of the desired thickness and density, in combination with needle and shuttle mechanisms, said needle mechanism operating to project binder-threads through the body of such mass, means arranged to engage the threads thus projected through the body of the mass and to form the same into loops, said shuttle mechanism operating to project binder-threads in diagonal relation with respect to the line of said loops and through said loops, as and for the purpose set forth.

10. In a machine for making fabrics having a body portion composed of stems, stalks or spears of grass, straw or the like, means for condensing and compacting the stems, stalks or spears into a flattened mass of the desired thickness and density, in combination with means for projecting binder-threads through the body of said mass, means for forming loops in the threads so projected through the body of the mass, and means for threading binder-threads through adjacent loops in zigzag lines, as and for the purpose set forth.

11. In a machine for making fabrics, the combination with means for condensing or compacting loose, unspun, unwoven material into a flattened mass to form the body of the fabric, means for feeding such body in a direction lateral with respect to the length of the unspun material, of means for applying binder-threads to such body in such manner as to successively bind definite portions of the body of the mass alternately to the portions lying next adjacent thereto on opposite sides thereof.

12. In a machine for making fabrics, means for condensing or compacting unspun stems, stalks or spears of grass or the like laterally upon each other to form a flattened mass of the desired width, thickness and density, in combination with means for applying binder-threads to such mass in parallel zigzag lines to bind the same into an integral fabric.

13. In a machine for making fabrics having a body portion composed of unspun stems, stalks or spears of grass, straw or the like, the combination with a table having openings therethrough, a needle mechanism operating through said openings, a hopper, and means for successively feeding the stems, stalks or spears of grass from said hopper to the table and laterally past said openings, as and for the purpose set forth.

14. In a machine for making fabrics having a body portion composed of unspun stems, stalks or spears of grass, straw or the like, a table, a plate arranged thereover to form a space or passage therebetween, said plate and table having openings therethrough, a needle mechanism operating through said openings, a hopper, and feeding mechanism operating past said hopper to deliver the stems, stalks or spears therefrom to said passage and to compact the same in and progress the same laterally through said passage and past said needle mechanism, as and for the purpose set forth.

15. In a machine for making fabrics having a body portion composed of unspun stems, stalks or spears of grass, the combination with a table, a coöperating plate arranged thereover to form a passage therebetween, a hopper, feeding mechanism operating past said hopper to deliver the stems, stalks or spears in increments into said passage, and needle and shuttle mechanisms arranged to apply binder-threads to said material while maintained in said passage to bind the same into an integral fabric of the desired thickness and density and substantially ultimate width, as and for the purpose set forth.

16. In a machine for making fabrics having a body portion composed of unspun stems, stalks or spears of grass, a table having a passage, feeding devices for crowding the stems, stalks or spears into said passage and compacting the same therein, in combination with needle and shuttle mechanisms arranged to bind said compacted mass into an integral fabric of the desired thickness, width and density, as and for the purpose set forth.

17. In a machine for making fabrics having a body portion composed of stems, stalks or spears of grass, straw or the like, a table having slots therethrough, feed-dogs arranged to operate through said slots, and means for actuating said feed-dogs to feed the material along said table, in combination with needle mechanism for stitching the material into an integral mass, as and for the purpose set forth.

18. In a machine for making fabrics having a body portion composed of stems, stalks or spears of grass, straw or the like, a table, a plate arranged thereover to provide a passage therebetween, feed-dogs for the material, and arranged to deliver the material into said passage, said feed-dogs being arranged in sets, and means for successively operating said sets of dogs, as and for the purpose set forth.

19. In a machine for making fabrics having a body portion composed of stems, stalks or spears of grass, straw or the like, a table, a plate arranged thereover to form a feed-passage for the material, feeding mechanism, means for actuating the same to crowd or compact the material into said passage in successive increments, and to correspondingly progress the same through said passage, in combination with means for applying binder-threads to said material while held in such compressed and compacted form and to bind the same into an integral fabric, as and for the purpose set forth.

20. In a machine for making fabrics having a body portion composed of stems, stalks or spears of grass, straw or the like, a table, a plate arranged thereover to form a passage for the material, a hopper arranged to deliver to said passage, feed-dogs arranged in sets, means for successively advancing said feed-dogs past said hopper to deliver the material therefrom to said passage in successive increments, in combination with means for binding said material while maintained in said passage into an integral fabric, as and for the purpose set forth.

21. In a machine for making fabrics having a body portion composed of stems, stalks or spears of grass, straw or the like, a table, a plate arranged thereover to form a passage therebetween, a hopper arranged to deliver to said passage, pivotally-mounted feed-dogs, means for rocking said feed-dogs into and out of engaging relation with respect to the material contained in said hopper, and means for moving said dogs past said hopper to deliver the material therefrom and into said passage, in combination with means for binding the material compacted into said passage into an integral mass, as and for the purpose set forth.

22. In a machine for making fabrics having a body portion composed of stems, stalks or spears of grass, straw or the like, a table, a plate arranged thereover to form a passage therebetween, a hopper arranged to deliver to said passage, feed-dogs arranged in sets, means for successively moving said sets of dogs past said hopper to advance the material therefrom into said passage, means for retaining each set of feed-dogs in advanced position until the next set approaches its advanced position, and means for binding the material maintained in compacted condition in said passage into an integral fabric, as and for the purpose set forth.

23. In a machine for making fabrics having a body portion composed of stems, stalks or spears of grass, straw or the like, a table, a plate arranged thereover to form a passage therebetween, a hopper delivering to said passage, slides arranged to operate past said hopper, feed-dogs pivotally mounted upon said slides, springs connected to said feed-dogs and operating to return or restore said slides to initial or retracted position, and means arranged to engage said dogs to advance the same past said hopper to deliver the material therefrom into said passage, and to compact the same therein, in combination with means for binding the compacted mass of material into an integral fabric, as and for the purpose set forth.

24. In a machine for making fabrics having a body portion composed of stems, stalks or spears of grass, straw or the like, a feed-hopper, slides operating past said hopper, said slides being arranged in sets, a feed-dog carried by each slide, means for successively operating said sets of slides to advance the feed-dogs carried thereby past said hopper to deliver the material therefrom, and means for maintaining each set of slides in advanced position until the succeeding set is moved to advanced position, as and for the purpose set forth.

25. In a machine for making fabrics having a body portion composed of stems, stalks or spears of grass, straw or the like, a feed-hopper, guideways arranged to extend therepast, slides mounted in said guideways and arranged in sets, a feed-dog carried by each slide, means for coincidently moving all the slides of each set past said hopper to feed the material therefrom, means for maintaining said sets of slides in advanced position until the next succeeding set of slides is advanced, and means for releasing the first set of slides to be advanced, as and for the purpose set forth.

26. In a machine for making fabrics having a body portion composed of stems, stalks or spears of grass, straw or the like, a feed-hopper, slides arranged in sets to operate past said hopper, a feed-dog pivotally mounted upon each slide and having an engaging portion arranged to be rocked into feeding relation with respect to the material contained in said hopper, each feed-dog also provided with a tailpiece, a drum having peripheral slots therein arranged in coöperative relation with respect to said tailpieces, and means for actuating said drum, as and for the purpose set forth.

27. In a machine for making fabrics, a hopper arranged to contain the material to form the body portion of the fabric, a feeding mechanism for such material comprising feed-dogs arranged in sets, means for actuating said feed-dogs to engage and deliver the material from said hopper in successive increments, said sets operating in successive order, and means for binding the material delivered from said hopper into an integral mass to form a fabric, as and for the purpose set forth.

28. In a machine for making fabrics, a feed-hopper to contain the material to form the body of the fabric, pivotally-mounted feed-dogs, slides upon which said dogs are pivotally mounted, means normally operating to maintain said slides in retracted position, in combination with a drum having peripheral slots therein coöperating with said dogs to advance and to release the same, as and for the purpose set forth.

29. In a machine for making fabrics, a hopper to contain the material to form the body of the fabric, feed-dogs arranged to deliver the material from said hopper, slides upon which said feed-dogs are pivotally mounted, yielding devices connected to said dogs and normally operating to return the same to initial position, in combination with a drum having slots through the periphery thereof, said slots being formed alternately on opposite sides of said drum and coöperating with said feed-dogs to advance and release said dogs in successive sets, as and for the purpose set forth.

30. In a machine for making fabrics, a feed-hopper to contain the material to form the body of the fabric, feed-dogs arranged to deliver the material from said hopper, said feed-dogs having tailpieces, means normally tending to maintain said feed-dogs in retracted position, a drum having slots formed through the periphery thereof and on opposite sides thereof, said slots being alternately arranged with respect to each other, each slot extending partially around the periphery of said drum and coöperating with the tailpieces of said dogs to advance the same, and to lock the same in advanced position, and finally to release the same in successive sets, as and for the purpose set forth.

31. In a machine for making fabrics, a needle-bar carrying needles, means for reciprocating the same, a series of hooks arranged to engage the needle-threads and to form the same into loops, a shuttle mechanism for passing a shuttle-thread through said loops, and means for actuating these several devices, as and for the purpose set forth.

32. In a machine for making fabrics, a needle-bar carrying needles, hooks arranged to engage the needle-threads and to form the same into loops, a shuttle mechanism for passing a shuttle-thread through said loops, and a take-up bar for taking up and rendering slack in the needle-threads, and means for actuating these several parts, as and for the purpose set forth.

33. In a machine for making fabrics having a body portion composed of untwisted and unwoven material, and in combination with means for compacting and compressing said material into a mass of the desired thickness and density and intermittently progressing the same, a needle-bar carrying needles arranged to be projected through such mass, a series of hooks arranged to engage the needle-threads when projected through such mass and to form the same into loops, a shuttle mechanism for passing a shuttle-thread through such loops, and means for actuating these several parts, as and for the purpose set forth.

34. In a machine for making fabrics having a body portion composed of untwisted and unwoven material, and in combination with means for compacting said material into a mass of the desired thickness and density and intermittently progressing the same, a reciprocatory needle-bar carrying needles arranged to be projected through such mass, a hook-bar operating transversely with respect to the line of movement of the needles and arranged below the line of feed of said mass to engage the needle-threads and to form the same into loops, a shuttle mechanism for passing a shuttle-thread through said loops, and means for actuating these several parts, as and for the purpose set forth.

35. In a machine for making fabrics having a body portion composed of untwisted and unwoven material, and in combination with means for compacting said material into a mass of the desired thickness and density and intermittently progressing the same, a needle-bar carrying needles arranged to be projected through said mass, hooks arranged to operate in a path below the line of feed of the mass and transversely with respect to the plane of action of the needles, to engage the needle-threads and to form the same into loops, a shuttle mechanism arranged to pass a shuttle-thread through said loops, and a take-up bar arranged to render and take up slack in said needle-threads, and means for actuating these several parts, as and for the purpose set forth.

36. In a machine for making fabrics having a body portion composed of untwisted and unwoven material, and in combination with means for compacting such material into a mass of the desired thickness and density and intermittently progressing the same, a reciprocatory needle-bar, needles carried thereby and arranged in a zigzag line transversely across the line of feed of the material, means arranged to engage the threads carried by said needles and to form the same into a loop at a point beneath the line of travel of the material, a shuttle mechanism for passing a shuttle-thread through such loops, and means for actuating these several parts, as and for the purpose set forth.

37. In a machine for making fabrics having a body portion composed of untwisted and unwoven material, and in combination with means for compacting such material into a mass of the desired thickness and density and intermittently progressing the same, a reciprocatory needle-bar carrying needles arranged in a staggered or zigzag line transversely across the line of progression of the material, hooks having their ends arranged in corresponding zigzag or staggered relation and cooperating with said needles to engage the needle-threads at a point beneath the line of progression of the material and to form the same into loops, a shuttle mechanism arranged to pass a shuttle-thread through such loops, and means for actuating these several devices, as and for the purpose set forth.

38. In a machine for making fabrics having a body portion composed of untwisted and unwoven material, and in combination with means for compacting such material into a mass of the desired thickness and density and intermittently progressing the same, a needle-bar having needles arranged in a zigzag or staggered line transversely across the line of progression of the material, means for forming the needle-threads into loops at a point below the line of progression of the material, a shuttle mechanism arranged to pass a shuttle-thread through such loops, means for arranging the shuttle-thread in correspondingly zigzagged or staggered relation, and means for actuating these several devices, as and for the purpose set forth.

39. In a machine for making fabrics having a body portion composed of untwisted and unwoven material, and in combination with means for compacting such material into a mass of the desired thickness and density, a reciprocatory needle-bar carrying needles, said needle-bar extending transversely across the line of progression of the material, and said needles arranged in lines inclined with respect to such line of progression, means arranged to engage the needle-threads on one side of the plane of progression of the material and to form the same into loops, a shuttle mechanism arranged to pass a shuttle-thread through such loops, means for carrying such shuttle-thread into inclined lines corresponding to the lines of needles, and means for actuating these several parts, as and for the purpose set forth.

40. In a machine for making fabrics having a body portion composed of untwisted and unwoven material, and in combination with means for compacting such material into a mass of the desired density and thickness and intermittently progressing the same, a needle-bar arranged to extend transversely across the line of progression of the material and carrying needles, said needles being arranged in staggered or zigzagged lines, hooks operating below the line of progression of the material to engage the needle-threads at such point, and to form the same into loops, shuttle mechanism arranged to pass a shuttle-thread through said loops, means for forming said shuttle-thread into correspondingly zigzagged or staggered relation, and means for actuating these several devices, as and for the purpose set forth.

41. In a machine for making fabrics having a body portion composed of untwisted and unwoven material, and in combination with means for compacting such material into a mass of the desired thickness and density and progressing the same intermittently, a reciprocatory needle-bar arranged to extend across the line of progression of the material and carrying needles, said needles being arranged in a staggered or zigzagged line, a bar arranged beneath the line of progression of the material to reciprocate toward and from the plane of action of the needles, hooks carried by said bar and arranged to engage the needle-threads to form the same into loops, a shuttle mechanism operating to pass a shuttle-thread through such loops, means for rendering slack in the needle-threads to permit of the formation of said loops, means for taking up such slack after the shuttle-thread has passed through such loops, and means for actuating these several devices, as and for the purpose set forth.

42. In a machine for making fabrics having a body portion composed of untwisted and unwoven material, and in combination with means for compacting such material into a mass of the desired thickness and density, a needle-bar arranged to extend across the line of progression of the material and carrying needles, said needles being arranged in a zigzag or staggered line, means operating below the line of progression of the material and arranged to engage the needle-threads and form the same into loops, a shuttle mechanism for passing a shuttle-thread through such loops, means for successively forming said shuttle-thread into zigzag relation from one side of the machine to the other, and means for actuating said several parts, as and for the purpose set forth.

43. In a machine for making fabrics having a body portion composed of stems, stalks or spears of grass, straw or the like, and in combination with means for compacting the same into a mass of the desired thickness and density and progressing the same, a reciprocatory needle-bar arranged to extend across the line of progression of the material and carrying needles, means arranged below the line of progression of the material to engage the needle-threads when projected through such mass and to form the same into loops, a shuttle mechanism arranged to pass a shuttle-thread through said loops, means for raising the shuttle-thread when passed through said loops into proximity to the under side of the mass of material, and means for actuating said several mechanisms, as and for the purpose set forth.

44. In a machine for making fabrics having a body portion composed of stems, stalks or spears of grass, straw or the like, and in combination with means for compacting the same into a mass of the desired thickness and density and progressing the same, a reciprocatory needle-bar arranged to extend across the line of progression of the mass and carrying needles, means arranged to engage the needle-threads and to form the same into loops after the needles have been projected through the mass of material, a shuttle mechanism arranged to pass a shuttle-thread through such loops, means for raising the shuttle-thread when passed through said loops into proximity to the mass, means for paying out slack in the needle-threads to form the loops, means for taking up such slack when the shuttle-thread has been raised, and means for actuating said several devices, as and for the purpose set forth.

45. In a machine for making fabrics having a body portion composed of stems, stalks or spears of grass, straw or the like, and in combination with means for compacting the same into a mass of the desired thickness and density and progressing the same, a reciprocatory needle-bar arranged to extend transversely across the line of progression of the mass and carrying needles, said needles being arranged in a staggered or zigzagged line, means operating below the line of progression of the mass to engage the needle-threads and form the same into loops, a shuttle mechanism arranged to pass a shuttle-thread through such loops, a series of bars arranged to engage said shuttle-thread to form the same into zigzagged or staggered relation corresponding with the zigzagged or staggered relation of the needles, and means for actuating said several devices, as and for the purpose set forth.

46. In a machine for making fabrics having a body portion composed of stems, stalks or spears of grass, straw or the like, and in combination with means for compacting such material into a mass of the desired thickness and density and progressing the same, a reciprocatory needle-bar arranged to extend across the line of progression of the material and carrying needles arranged in a staggered or zigzagged line, means operating below the path of progression of the mass to engage the needle-threads and to form the same into loops, a shuttle mechanism arranged to pass a shuttle-thread through such loops, a series of sliding bars operating transversely with respect to the length of the shuttle-thread, means for successively reciprocating said bars to form said shuttle-thread into staggered or zigzagged relation corresponding to the arrangement of the needles, and means for actuating these several mechanisms, as and for the purpose set forth.

47. In a machine for making fabrics having a body portion composed of stems, stalks or spears of grass, straw or the like, and in combination with means for compacting such material into a mass of the desired thickness and density and progressing the same, a needle-bar arranged to extend across the line of progression of the mass and carrying needles, said needles arranged in a staggered or zigzagged line, means operating below the line of progression of the material to engage the needle-threads and form the same into loops, a shuttle mechanism arranged to pass a shuttle-thread through such loops, a series of reciprocatory bars arranged to operate transversely with respect to the line of the shuttle-thread, means for placing the shuttle-thread in position to be engaged by said shuttle-bars, means for successively engaging said bars to project the same into position to zigzag or stagger the shuttle-thread to correspond with the zigzagged or staggered relation of the needles, and means for actuating said several mechanisms, as and for the purpose set forth.

48. In a machine of the class described, a table having a transverse slot therethrough, means for compacting stems, stalks or spears of grass, straw or the like into a mass of the desired thickness and density and progressing the same along said table and over said slot, a reciprocatory needle-bar extending transversely across the line of progression of said mass and carrying needles, said needles arranged to operate through the slot in said table, means arranged beneath said table to engage the needle-threads and to form the same into loops, a shuttle mechanism arranged to pass a shuttle-thread through said loops, and means for actuating these several parts, as and for the purpose set forth.

49. In a machine of the character described, a table having a transversely-extending zigzagged or staggered opening therethrough, means for compacting stems, stalks or spears of grass, straw, or the like into a mass of the desired degree of thickness and density and progressing the same along said table and past said slot, a reciprocatory needle-bar extending across the line of progression of the material and carrying needles arranged in a staggered or zigzagged line, said needles operating through the slot in the table, means operating beneath the table to engage the needle-threads and to form the same into loops, means for passing a shuttle-thread through said loops, means for paying out and taking up the slack in said needle-threads, and means for actuating said several parts, as and for the purpose set forth.

50. In a machine of the character described, a table having an opening therethrough, means for compacting stems, stalks or spears of grass, straw or the like, into a mass of the desired degree of thickness and density and progressing the same along said table and past said opening, a reciprocatory needle-bar extending across the line of progression of the material and carrying needles arranged to be projected through said mass and through the opening in said table, means arranged to receive said needles when in their fully-projected positions for guiding and steadying the same, means arranged to engage the threads carried by said needles and to form the same into loops at a point below said table, means for passing a binder-thread through said loops, and means for actuating said several parts, as and for the purpose set forth.

51. In a machine of the character described, a support, a table carried thereby, said support provided with rearwardly-projecting ledge, means for compacting stems, stalks or spears of grass, straw or the like, into a mass of the desired thickness and density and progressing the same along said table, a reciprocatory needle-bar carrying needles arranged to be projected through said mass, means arranged to engage and form the threads carried by said needles into loops at points below said table, and a shuttle arranged to be passed upon said ledge and through said loops, a take-up bar, and means for actuating said several parts, as and for the purpose set forth.

52. In a machine of the class described, a support, a table carried thereby, said table having an opening therethrough, means for feeding the material to form a fabric along said table and past said opening, a needle-bar carrying needles arranged to be projected through said material and said opening, said support provided with a ledge having seats arranged therein to form a guide for the needles, and a movable plate having coöperating seats, as and for the purpose set forth.

53. In a machine of the character described, a support, a table carried thereby and having an opening therethrough, a reciprocatory needle-bar carrying needles arranged to work through said opening, said opening and needles being arranged in staggered or zigzagged lines, a rearwardly-projecting ledge formed on said support having seats formed therein in correspondingly zigzagged or staggered relation, said ledges being arranged below said table, and a movable plate having corresponding seats formed in staggered or zigzagged relation and coöperating with the seats formed in said ledge to form guides for the needles, as and for the purpose set forth.

54. In a machine of the character described, a needle-bar, means for reciprocating the same, needles carried by said bar and arranged to be projected through a mass of stems, stalks or spears of grass, straw or the like, a bar having hooked fingers arranged to engage the thread carried by said needles and to form the same into loops, a plate mounted to slide upon said finger-bar, said bar and plate being capable of slight relative movement, as and for the purpose set forth.

55. In a machine of the character described, a reciprocatory needle-bar, needles carried thereby, a table, means for feeding the material to form the body of the fabric along said table, said needles operating through said material and openings through said table, a bar arranged to move toward and from the line of action of said needles and carrying hooks, said hooks operating to engage the needle-threads and to form the same into loops, means for passing a binder-thread through said loops, pivotally-mounted fingers arranged to be actuated by said hook-bar to raise said binder-thread into proximity to said table, means for taking up the slack in said loops, and means for actuating said several devices, as and for the purpose set forth.

56. In a machine of the character described, a table having an opening therethrough, means for feeding and progressing a mass of stems, stalks or spears of grass, straw or the like, along said table, a reciprocatory needle-bar carrying needles arranged to be projected through said mass and through an opening in said table, means arranged to engage the needle-threads at a point below said table and to form the same into loops, means for passing a binder-thread through said loops, pivotally-mounted fingers, means for rocking the same to engage said binder-thread to raise the same into proximity to the table, and means for actuating said several mechanisms, as and for the purpose set forth.

57. In a machine of the character described, and in combination with needle mechanism, means arranged to engage the threads of the needle mechanism, said means operating to form the same into loops, means for passing a binder-thread through said loops, elevating mechanism for elevating said binder-thread into proximity to the point of application of the needles to the material upon which the needle mechanism operates, and means for actuating said several devices, as and for the purpose set forth.

58. In a machine of the character described, a needle mechanism including a reciprocatory needle-bar, needles carried thereby and arranged in a staggered or zigzagged line, means for feeding stems, stalks or spears of grass, straw or the like, *en masse* past the line of action of said needles, whereby said needles are projected through such mass, a hook-bar carrying hooked fingers arranged to operate below the line of feed of the mass to engage the needle-threads and to form the same into loops, means for passing a binder-thread through said loops, a series of reciprocatory arms arranged to operate in proximity to the points of application of the needles to said mass of material, pivoted fingers arranged to raise the binder-thread into position in advance of said reciprocatory arms, and means for actuating said several mechanisms, as and for the purpose set forth.

59. In a machine of the character described, a reciprocatory needle-bar carrying needles arranged to be projected through a mass of stems, stalks or spears of grass, a hook-bar carrying hooked fingers arranged to engage the threads of the needles at a point below the mass upon which the needles operate, and to form the same into loops, means for passing a binder-thread through said loops, and means for preventing the disengagement of said needle-threads from said hooks, as and for the purpose set forth.

60. In a machine of the character described, a main drive-shaft, cams carried thereby, a needle-bar and a take-up bar, arms arranged to straddle and to be guided by said shaft and connected to said bars, respectively, and projections carried by said arms and engaged by said cams for actuating said bars, as and for the purpose set forth.

61. In a machine of the character described, a main drive-shaft, cams carried by said shaft, needle take-up and loop-forming mechanisms, including reciprocatory bars, arms arranged to be guided by said shaft and connected to said needle and take-up bars, and having projections arranged to be engaged by said cams for reciprocating said bars, and levers pivotally mounted intermediate their ends and connected at one end to said loop-forming bar, the other end arranged to be engaged by a cam upon said main shaft, as and for the purpose set forth.

62. In a machine of the character described, a needle-bar, a take-up bar, a loop-forming mechanism including a bar and shuttle-throwing mechanism, a main drive-shaft, cams carried by said shaft, arms connected to said needle and take-up bars and arranged to be engaged by said cams for actuating the same, pivotally-mounted levers connected to the supporting-bar of said loop-forming mechanism and arranged to be rocked by the cams on said main shaft, and gearing actuated by said main shaft for operating said shuttle mechanism, as and for the purpose set forth.

63. In a machine of the character described, and in combination with needle and loop-forming mechanism, and a shuttle mechanism arranged to pass a binder-thread through the loops formed in the threads of the needle mechanism, said needle mechanism including needles arranged in a staggered or zigzagged line, a main drive-shaft, means actuated thereby for operating said several mechanisms, a counter-shaft driven from said main shaft and carrying inclined cams, and means for correspondingly staggering said binder-thread, including reciprocatory bars, said bars arranged to be engaged by said inclined cams, whereby they are successively actuated, as and for the purpose set forth.

64. In a machine of the character described, a needle-bar carrying needles arranged in a zigzag or staggered line, a table, a plate arranged thereover but separated therefrom to provide a space or passage therebetween, means for successively feeding increments of untwisted and unwound material into said passage and progressing the same therethrough and past the line of action of said needles, said table having an opening through which said needles operate, a hook-bar arranged beneath said table and having hook-fingers operating to engage the threads carried by the needle and to form the same into loops, a shuttle mechanism for passing a binder-thread through said loops, a plate mounted upon said hook-bar to slide therewith, said hook-bar and plate arranged for slight independent movement, pivotally-mounted fingers arranged in the path of movement of said hook-bar, reciprocatory arms for forming the binder-thread in correspondingly staggered or zigzag relation, said fingers operating to raise the binder-twine into position in advance of the ends of said arms, and means for actuating said several mechanisms, as and for the purpose set forth.

65. In a machine for making fabrics, means for assembling a quantity of unspun stems, stalks or spears of grass, straw or the like, means for compacting the same in assembled relation and to substantially the ultimate width, and means for binding the compacted bunches thereof to form the fabric, as and for the purpose set forth.

66. In a machine for making fabrics, means for assembling a quantity of unspun stems, stalks or spears of grass, straw or the like, means for compacting the assembled mass, means for binding individual bunches of such mass, and mechanism for binding an association of such bunches to each other to form a fabric of substantially the desired ultimate width, as and for the purpose set forth.

67. In a machine for making fabrics, means for assembling loose, unspun unwoven material, means for compacting such material, and mechanism for binding together individual bunches of such compacted material to form the fabric of substantially the desired ultimate width, as and for the purpose set forth.

68. In a machine for making fabrics having a body portion composed of unspun stems, stalks or spears of grass, straw or the like, the combination with means for laterally compacting the material forming the body portion of the fabric to be produced and to substantially the ultimate width thereof, means for binding the compacted material, and means for progressing such material laterally past the binding mechanism, for the purpose set forth.

69. In a machine for making fabrics having a body portion composed of unspun stems, stalks or spears of grass, straw or the like, the combination with means for laterally compacting the material forming the body portion of the fabric to be produced and to substantially the ultimate width thereof, means for applying to the compacted material binder-threads in zigzagged relation with respect to the length of the stems, stalks or spears, and means for progressing such material laterally past the binding mechanism, for the purpose set forth.

In witness whereof I have hereunto set my hand, this 11th day of February, 1904, in the presence of the subscribing witnesses.

GEORGE A. LOWRY.

Witnesses:
C. H. SEEM,
S. E. DARBY.